US012591040B2

(12) United States Patent
Konanur et al.

(10) Patent No.: US 12,591,040 B2
(45) Date of Patent: Mar. 31, 2026

(54) DETERMINING ANTENNA PHASE CENTER USING BASEBAND DATA

(71) Applicant: Tesla, Inc., Austin, TX (US)

(72) Inventors: Anand S. Konanur, San Jose, CA (US); Atul Salhotra, Palo Alto, CA (US)

(73) Assignee: Tesla, Inc., Austin, TX (US)

( * ) Notice: Subject to any disclaimer, the term of this patent is extended or adjusted under 35 U.S.C. 154(b) by 284 days.

(21) Appl. No.: 18/573,061

(22) PCT Filed: Jun. 29, 2022

(86) PCT No.: PCT/US2022/035577
§ 371 (c)(1),
(2) Date: Dec. 21, 2023

(87) PCT Pub. No.: WO2023/278615
PCT Pub. Date: Jan. 5, 2023

(65) Prior Publication Data
US 2024/0288541 A1 Aug. 29, 2024

Related U.S. Application Data

(60) Provisional application No. 63/202,958, filed on Jul. 1, 2021.

(51) Int. Cl.
*G01S 7/40* (2006.01)
*G01S 13/32* (2006.01)

(52) U.S. Cl.
CPC .......... *G01S 7/4026* (2013.01); *G01S 7/4086* (2021.05); *G01S 13/325* (2013.01)

(58) Field of Classification Search
CPC .... G01S 7/4026; G01S 7/4086; G01S 13/325; G01S 13/343; G01S 13/931; B60W 2420/408; G05D 2111/30
See application file for complete search history.

(56) References Cited

U.S. PATENT DOCUMENTS

| | | |
|---|---|---|
| 2019/0227157 A1 | 7/2019 | Culkin |
| 2019/0293753 A1 | 9/2019 | Iwawa et al. |
| 2019/0346544 A1* | 11/2019 | Hammes ............... G01S 13/931 |

OTHER PUBLICATIONS

J.-p. Shang, De-min Fu, Ying-bo Deng and Shuai Jiang, "Measurement of phase center for antenna with the method of moving reference point," 2008 8th International Symposium on Antennas, Propagation and EM Theory, Kunming, China, 2008, pp. 114-117 (Year: 2009).*

(Continued)

*Primary Examiner* — Robert W Hodge
*Assistant Examiner* — Bongani Jabulani Mashele
(74) *Attorney, Agent, or Firm* — Knobbe, Martens, Olson & Bear, LLP

(57) ABSTRACT

One or more aspects of the present disclosure relate to the configuration and management of sensor components. More specifically, one or more aspects of the present application relate to the management of the operational parameters of radar sensors mounted on a vehicle. The radar sensors illustratively are configured with multiple input, multiple output based radar components that provide a phased array. A control component obtains and processes the measured complex response of an antenna array and utilizes the processing results to determine the phase center and optimize the operation of the radar sensor components.

20 Claims, 10 Drawing Sheets

(56)        References Cited

OTHER PUBLICATIONS

International Search Report and Written Opinion dated Nov. 16,
2022 in application No. PCT/US2022/035577.

* cited by examiner

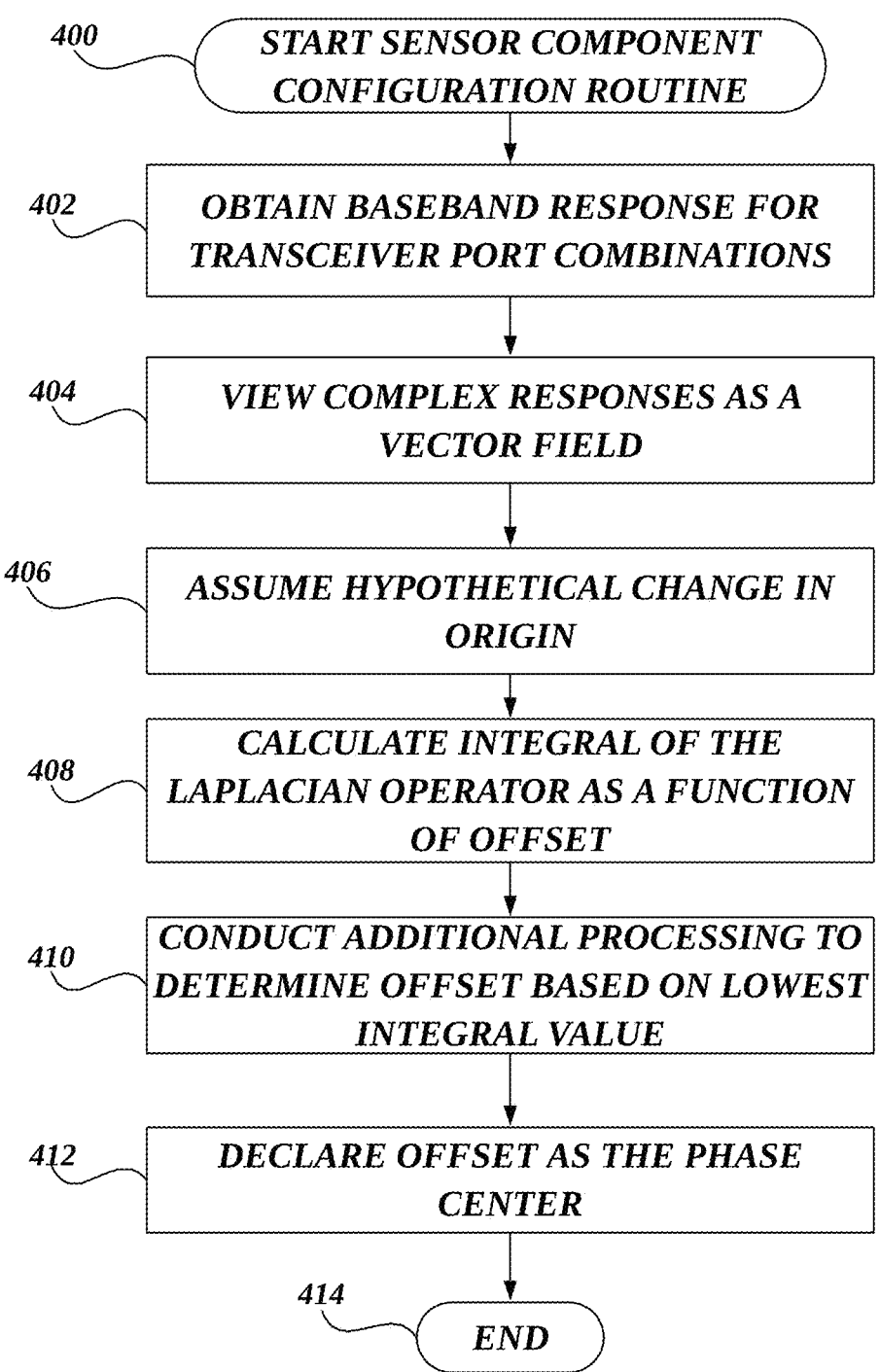

*400* START SENSOR COMPONENT CONFIGURATION ROUTINE

*402* OBTAIN BASEBAND RESPONSE FOR TRANSCEIVER PORT COMBINATIONS

*404* VIEW COMPLEX RESPONSES AS A VECTOR FIELD

*406* ASSUME HYPOTHETICAL CHANGE IN ORIGIN

*408* CALCULATE INTEGRAL OF THE LAPLACIAN OPERATOR AS A FUNCTION OF OFFSET

*410* CONDUCT ADDITIONAL PROCESSING TO DETERMINE OFFSET BASED ON LOWEST INTEGRAL VALUE

*412* DECLARE OFFSET AS THE PHASE CENTER

*414* END

*Fig.4.*

DETERMINING ANTENNA PHASE CENTER USING BASEBAND DATA

CROSS-REFERENCE TO RELATED APPLICATION

This application claims priority to U.S. Provisional Application No. 63/202,958, entitled DETERMINING ANTENNA PHASE CENTER USING BASEBAND DATA, and filed on Jul. 1, 2021. U.S. Provisional Application No. 63/202,958 is incorporated by reference in its entirety herein.

BACKGROUND

Generally described, a variety of vehicles, such as electric vehicles, combustion engine vehicles, hybrid vehicles, etc., can be configured with various sensors and components to facilitate operation. For example, vehicles can be configured to operate autonomously or semi-autonomously in which user input is optional, reduced or otherwise de-emphasized during travel. In such application, the operation of the vehicle may be assisted using information about the vehicle's movement and the surrounding driving environment captured by various sensors/components, such as radar detection systems. Typically, the benefit provided by sensor components, such as radar components, can be directly dependent on the control mechanisms and sensor components being calibrated.

With regard to antenna components, such as radar antennas, performance of the antenna component can be optimized or improved based on determination of antenna phase center. Generally, described an antenna phase center is defined as being the point where a signal is collected. The offset between the mean phase center and the geometric center of an antenna can range from a few millimeters to several centimeters. Physical antenna phase centers today are painstakingly determined by separating the antenna from the rest of the radio frequency (RF) and baseband systems, placing the antenna in an anechoic chamber, and then performing a fine scan of the antenna pattern (complex antenna pattern) including the phase response of the antenna as a function of 3D angle. Subsequently, the antenna response is post processed to determine the phase center.

In other instances, the antenna is repeatedly moved in the measurement domain, until its phase response is insensitive to rotation. In this instance, the phase center can be determined by trial and error after repeated measurements. None of these methods can be used on fully functioning systems. The act of separating the antenna from the system, in some sense, disrupts the integrity of the measurement and in other cases just renders the method impractical.

BRIEF DESCRIPTION OF DRAWINGS

FIG. 4 shows a method for radar-sensor configuration processing.

DETAILED DESCRIPTION

Figure 1:
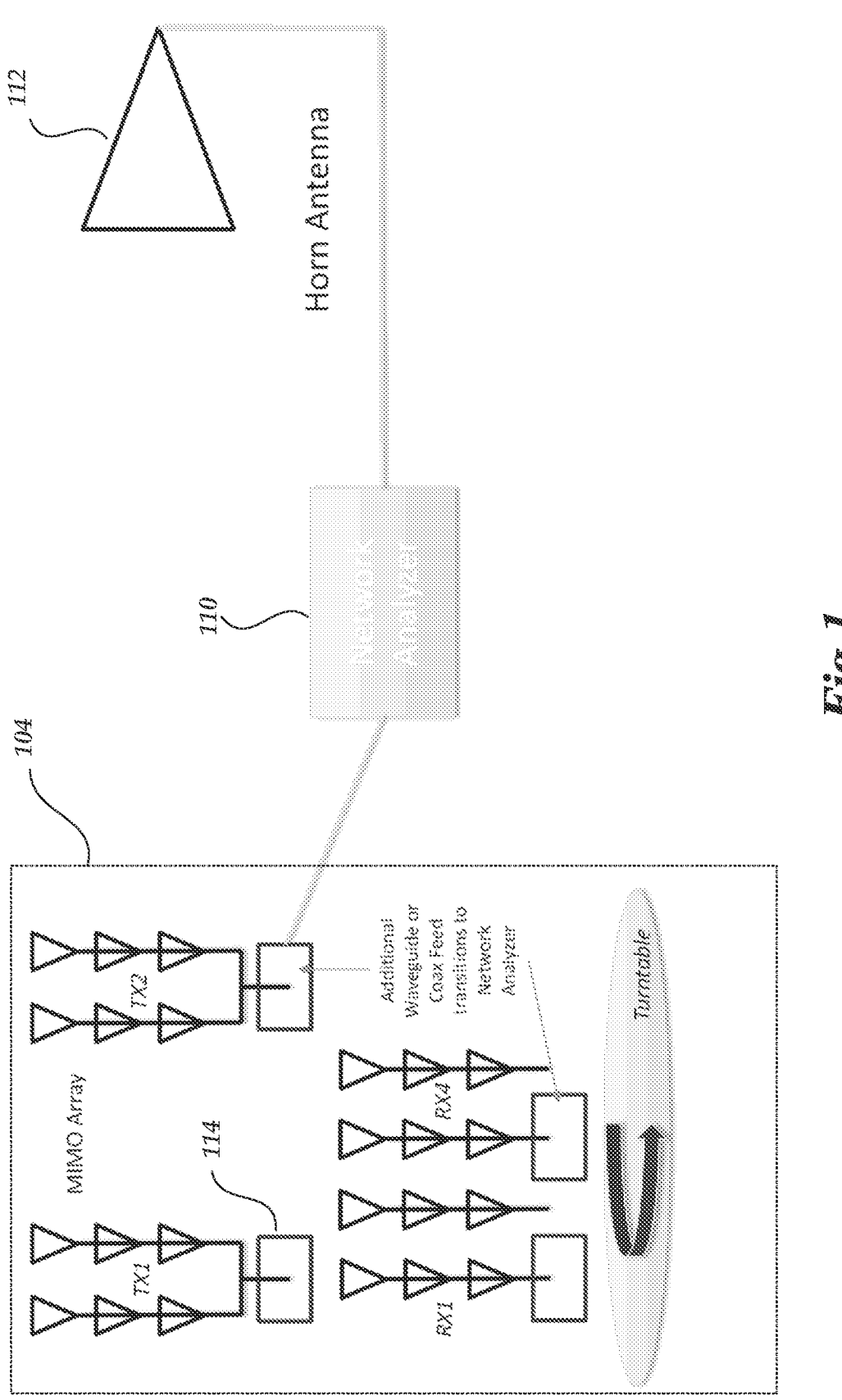
FIG. 1 is a block diagram of an embodiment of a phase center estimation system.

Generally described, one or more aspects of the present disclosure relate to the configuration and management of sensor components. More specifically, one or more aspects of the present application relate to the management of the operational parameters of radar sensors mounted on a vehicle. The radar sensors illustratively are configured with multiple input, multiple output based radar components that provide a phased array. A control component obtains and processes the measured complex response of an antenna array and utilizes the processing results to determine the phase center and optimize the operation of the radar sensor components.

Generally described, car-based radio detection and ranging (RADAR) systems can be used to actively estimate range, angle, or Doppler frequency shift to environmental features by emitting radio signals and detecting returning reflected signals. Distances to radio-reflective features can be determined according to the time delay between transmission and reception. The car-based radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

In some examples, directional antennas can be used for the transmission or reception of signals to associate each range estimate with a bearing. More generally, directional antennas can also be used to focus radiated energy on a given field of view of interest, such as the forward-facing, side-facing and rear-facing surfaces of the vehicle to detect objects/information. Combining the measured distances and the directional information allows for the surrounding environment features to be mapped. In other examples, non-directional antennas can be alternatively used. In these examples, a receiving antenna may have a 90 degree field of view, and may be configured to utilize multiple channels with a phase offset to determine angle of arrival of the received signal. The radar sensor can thus be used, for instance, by an autonomous vehicle control system to avoid obstacles indicated by the sensor information.

Some example automotive radar systems may be configured to operate at an electromagnetic wave frequency range of 76-77 Giga-Hertz (GHz). These radar systems may use transmission antennas that can focus the radiated energy into tight beams in order to enable receiving antennas (e.g., having wide angle beams) in the radar system to measure an environment of the vehicle with high accuracy.

Many modern telecommunications standards, particularly in the consumer space, have adopted multiple input, multiple output antenna (MIMO) technology because of the significant advantages it provides over similar system utilizing single antenna transceivers (SISO). Multiple-input multiple-output (MIMO) radar is an advanced type of phased array radar employing digital receivers and waveform generators distributed across the aperture. MIMO radar signals propagate in a fashion similar to multistatic radar.

In a traditional phased array system, additional antennas and related hardware are needed to improve spatial resolution. MIMO radar systems transmit mutually orthogonal signals from multiple transmit antennas, and these waveforms can be extracted from each of the receive antennas by a set of matched filters. For example, if a MIMO radar system has x transmit antennas and y receive antennas, the product, or x*y, signals can be extracted from the receiver because of the orthogonality of the transmitted signals. That is, a x*y-element virtual antenna array is created using only x+y antennas by conducting digital signal processing on the received signals, thereby obtaining a finer spatial resolution compared with its phased array counterpart.

Traditional methods for obtaining radar antenna centers can be used on fully functioning systems. The act of separating the antenna from the system, in some sense, disrupts the integrity of the measurement and in other cases just renders the method impractical. For instance, measuring the phase centers of 8 or 10 ports in a Radar receiver array would involve creating multiple coupons, with a few ports fed each time (due to close proximity of ports and large size of waveguide feeds). Additionally, in MIMO Radar, we are most directly concerned with the phase centers of a virtual array formed by the convolution of the real receiver array with the locations of the Tx antenna array. Traditional methods described above are incapable of measuring such a virtual array, since it's only formed when the transceiver chip is sending a different coded chirp through each transmitter antenna element.

The present disclosure provides a method of using the output of the radio transceiver itself to estimate these phase centers and obviates the need for physical access to the antenna feed ports. As such, it can be used to calibrate Radar/GNSS etc. antenna in-situ (on car), with the potential to scale the procedure to all cars as they roll off the production line. Antenna phase center or radiation center refers to the hypothetical point from which radiation appears to originate. Such a point is critical in applications such as GNSS/GPS, and automotive radar. In GPS systems, the location at fix is that of the phase center of the GNSS antenna. In radar applications, the accuracy of the estimate of angle of arrival of a scattered signal is determined predominantly by the accuracy of the estimated phase centers of the antenna that is retained by the signal processing algorithms.

Illustratively, a control component obtains and processes the measured complex response of an antenna array (in the frequency domain) as a function of angle (e.g. azimuth angle) as a vector field (a collection of vectors placed along points corresponding to the orientation of measurement). The control component then calculates the transformed complex response from a hypothetical transformation of the origin of the coordinate system. For each such hypothetical origin, the control component determines the degree of flatness in the complex response of an array port to identify a point which minimizes the variation in the vector field. Such processing results can be characterized as declaring or identifying the phase center of the antenna array.

Although the various aspects will be described in accordance with illustrative embodiments and combination of features, one skilled in the relevant art will appreciate that the examples and combination of features are illustrative in nature and should not be construed as limiting. FIG. 1 is a block diagram of a logical representative of various components of a vehicle and analyzer system 100 formed in accordance with aspects of the present application. As illustrated in FIG. 1, the vehicle 102 includes one or more radar sensor components 104 for utilization in the operation of the vehicle. Individual radar-sensor components can be implemented in a MIMO array as illustrated in FIG. 1. The system can further include a network analyzer 110 and another antenna 112 (illustratively a horn antenna) for generating signals, obtaining measured responses from the MIMO array and determining the operational parameters of the MIMO array. Illustratively, the processing of the MIMO array operational parameters does not require a manual adjustment of the radar component 104 or modification of the physical components of the underlying hardware components that implement the MIMO array 114. Accordingly, this results in the ability to determine operational parameters for MIMO arrays in a more efficient manner and addresses the deficiencies in the traditional manner for other determination methods, as described in part in the present disclosure. Detailed configuration of the analysis methodology in accordance with the present application will be described below.

Figure 2A:
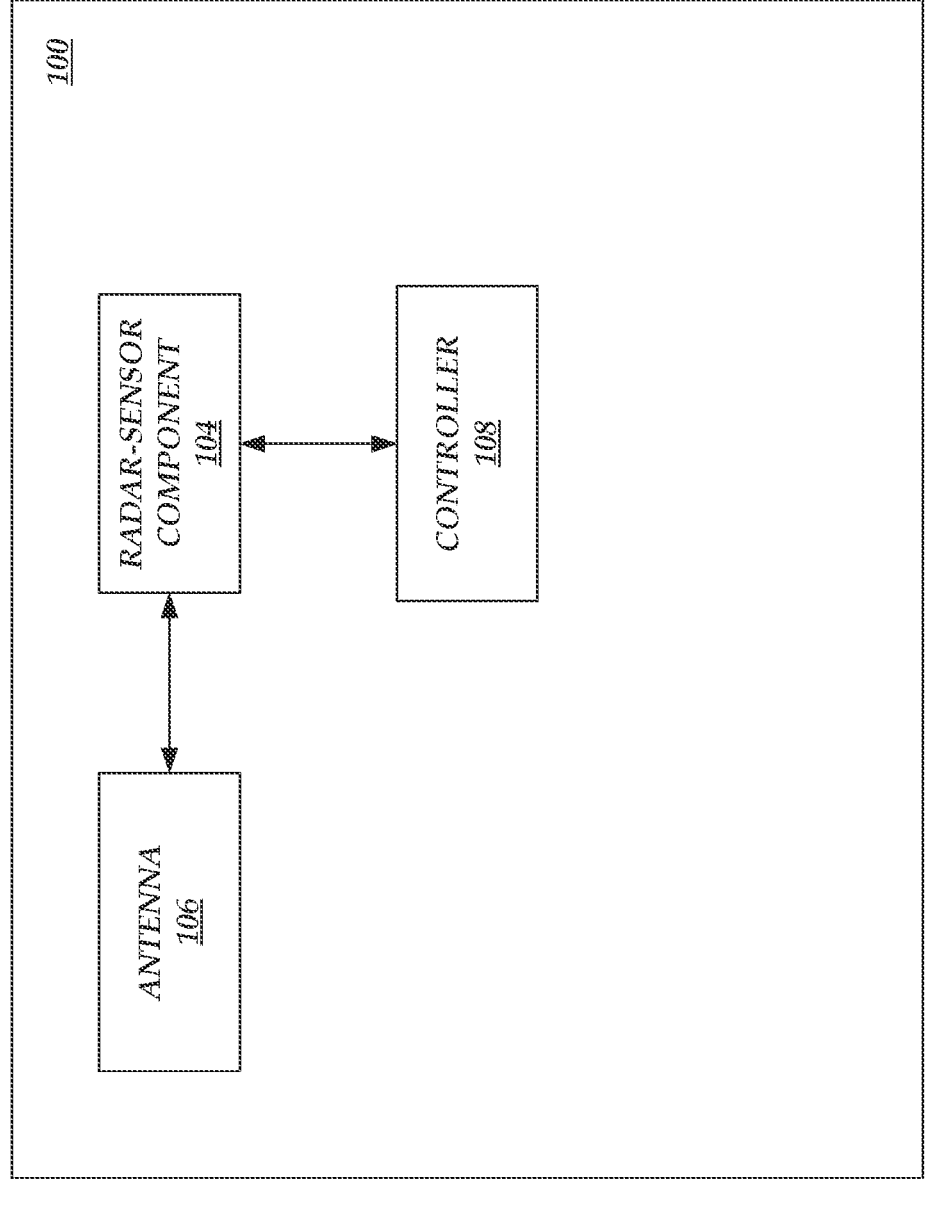
FIG. 2A is a block diagram of a logical representative of various components of a vehicle including a control component and a radar component.

In an illustrative embodiment, one or more aspects of the present application can correspond to the determination of the illustrative components of the vehicle and analyzer system 100 in a vehicle or other device that may utilize radar sensing components FIG. 2A is illustrative of a vehicle 102 comprising a radar component 104, antenna 106 and a controller component 110. Vehicle 102 may include any type of vehicle that incorporates one or more radar sensing components. Additionally, the controller component 108 may include one or more physical or virtual components configured to control the operation of the radar sensing components 104 and antenna 106 and implement processing for determining various operational parameters of the radar sensing components 104. Accordingly, aspects of the present application are not limited to any particular type or implementation of vehicle 102, radar sensing component 104 or antenna 106.

Figure 2B:
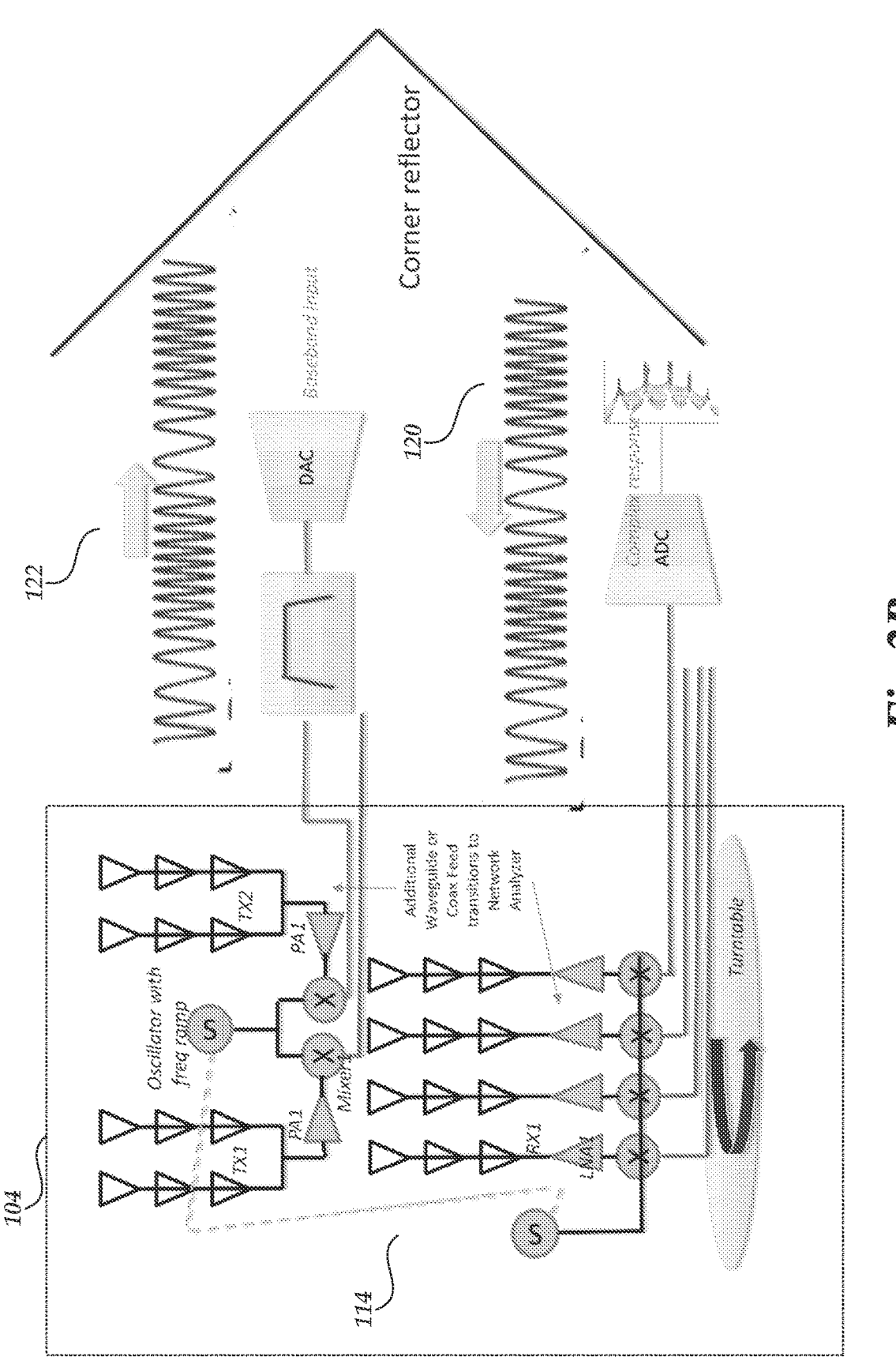
FIG. 2B is a block diagram of an embodiment of a phase center estimation system.

FIG. 2B is a block diagram of a logical representative of various components of a vehicle and analyzer system 100 formed in accordance with aspects of the present application. FIG. 2B represents an alternative embodiment of the logical representation of FIG. 1, illustrating the utilization and configuration of the analysis methodology of the present application. FIG. 1 may represent a configuration for measurement wherein there is access to the antenna through a coaxial cable or waveguides. FIG. 2 may represent a configuration for data collection to support phase center estimation wherein there isn't access to the antenna. There may not be access to the antenna due to highly integrated designs. FIG. 2B illustrates the generation of signals 120 received by the MIMO antenna 114. Additionally, FIG. 2B further illustrates the receipt of the generated outputs 122 by the MIMO array 114 to facilitate the determination of the operational parameters of the MIMO antenna 114 in accordance with various aspects of the present application.

Figure 3:
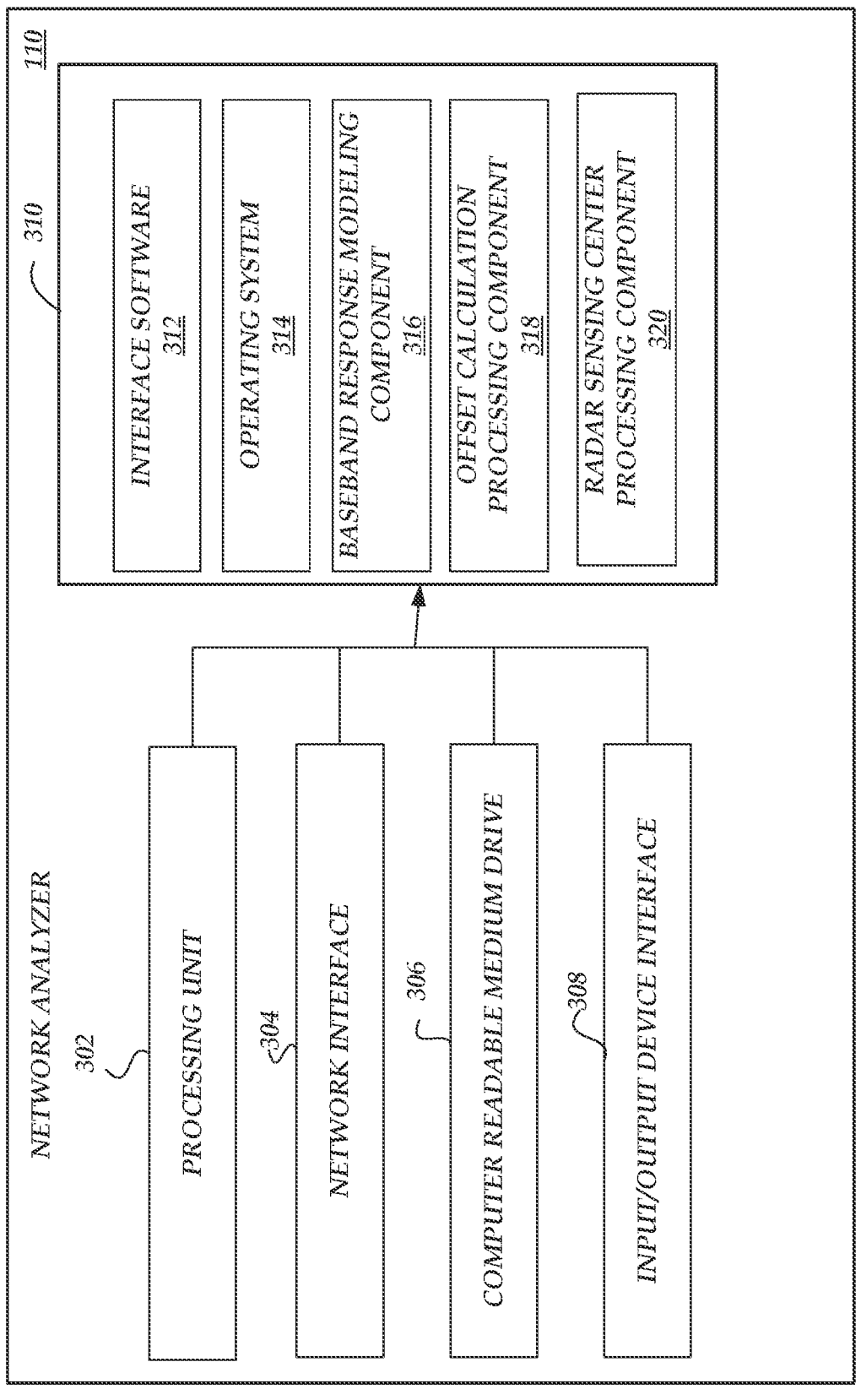
FIG. 3 is a block diagram of illustrative components of a processing component/service for performing the analysis methodology.

FIG. 3 is block diagram illustrative of a processing component/service for performing the functions of the vehicle and analyzer system 100. The processing component comprises a processing unit 302, a network interface 304, a computer readable medium drive 306, and an input/output device interface.

The network interface 304 may provide connectivity to one or more networks or computing systems. The processing unit 302 may thus receive information and instructions from other computing systems or services via a network. The processing unit 302 may also communicate to and from memory 310 and further provide output information for an optional display via the input/output device interface 308. In some embodiments, the vehicle and analyzer system 100 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the customer computing device 102. The memory 310 may further include computer program instructions and other information for implementing aspects of the present disclosure. For example, in one embodiment, the memory 310 includes interface software 312 for receiving a list of discovered SAML-enabled services and processing by selecting one or more services from the customer.

Additionally, the memory 310 includes a baseband processing component 314, a set of hypothetical offsets 316, and a phase center determination component 318.

Turning now to FIG. 4, a routine 400 for an illustrative radar-sensor configuration processing will be described. Routine 400 is illustrative implemented by a processing component/service, as illustrated in FIG. 2B. At block 402, the processing component obtains complex baseband response of each transceiver port Tx-Rx combination. Illustratively, the complex baseband response is obtained at each frequency and for an angular scan. Illustratively, the processing component can be located proximate to the radar-sensing component and antenna of a vehicle in order to obtain the complex baseband response. At block 404, the processing component view the complex response as a vector field.

At block 406, the processing component assumes a hypothetical change in origin or center of the radar sensing component, which can be defined as an offset. This allows for the establishment of multiple $e\hat{}(j*\text{additional path delay})$ measured from each relative target origin/center to the complex response. At block 408, the processing component calculates the integral of the Laplacian operator over the whole vector field as a function of offset.

Equation (1) describes the Laplacian function as:

$$\text{Laplacian}(F(\Theta_i,\phi_j))=0.25*(F(\Theta_{i+1},\phi_j)+F(\Theta_i,\phi_{j+1})+F(\Theta_{i-1},\phi_j)+F(\Theta_i,\phi_{j-1}))-F(\Theta_i,\phi_j)$$

Figure 5:
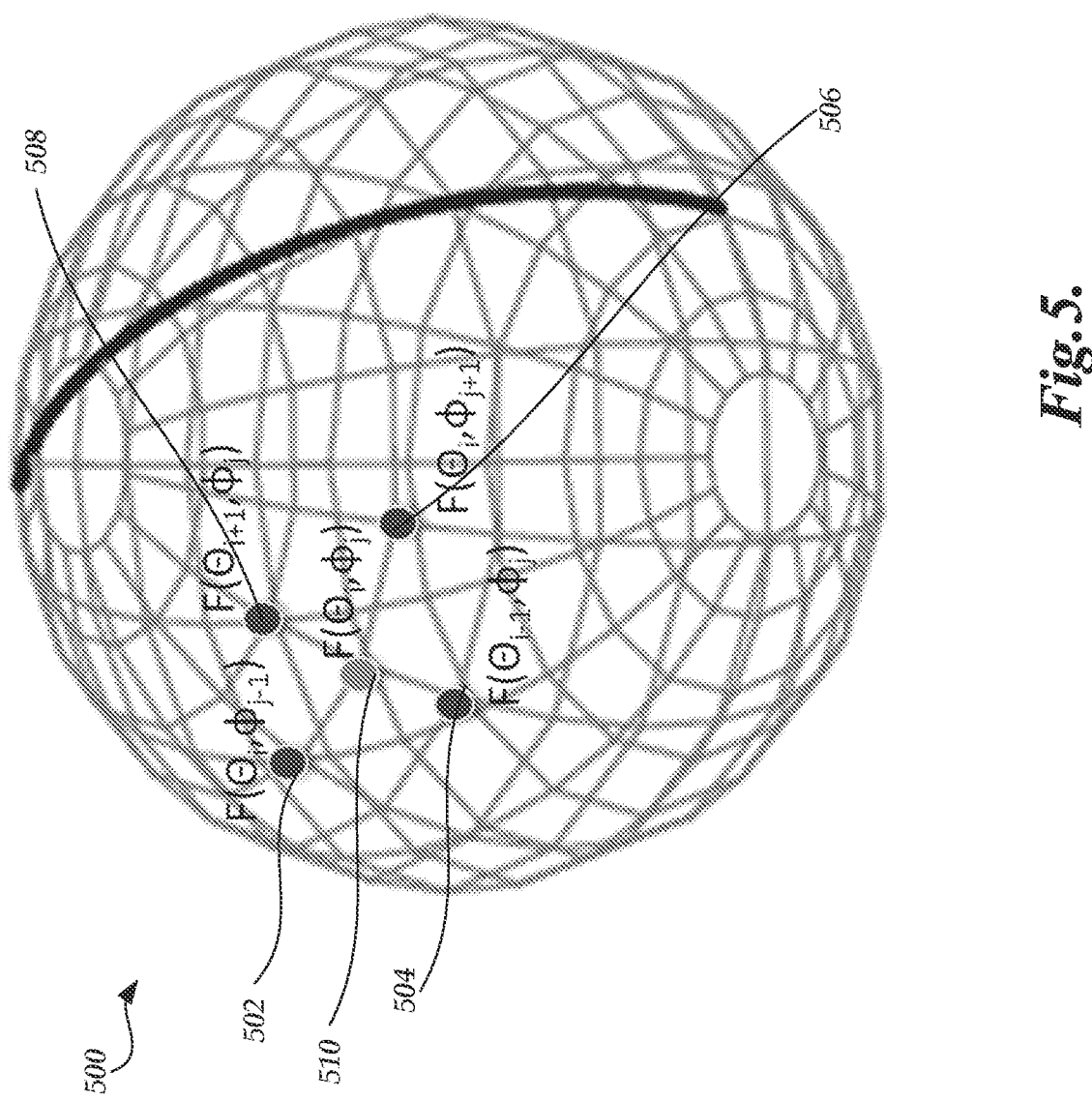
FIG. 5 shows a minimalized vector response.

Generally described, the physical meaning of the Laplacian of a vector field described on a circle or a sphere. Minimizing the Laplacian of the antenna response vector field is equivalent to finding the fixed offset in position of the antenna that results in a response that is invariant (or minimally variant) to changes in angle on the vector field. FIG. 5 illustrates the resulting minimalized vector response 500. As illustrated in FIG. 5, for every point 502, the processing component looks at neighboring points and takes the average measured distance. The processing result corresponds to a minimum of the sums across all the points.

At block 410, the processing component conducts further processing. Illustratively, the further processing includes utilization of particle swarm optimization or other search algorithm to determine the offset with the lowest Integral of the Laplacian over a whole angular cut. Illustratively, the resulting determined offset may be according to a single plane or over some fraction of a sphere.

Figure 6A:
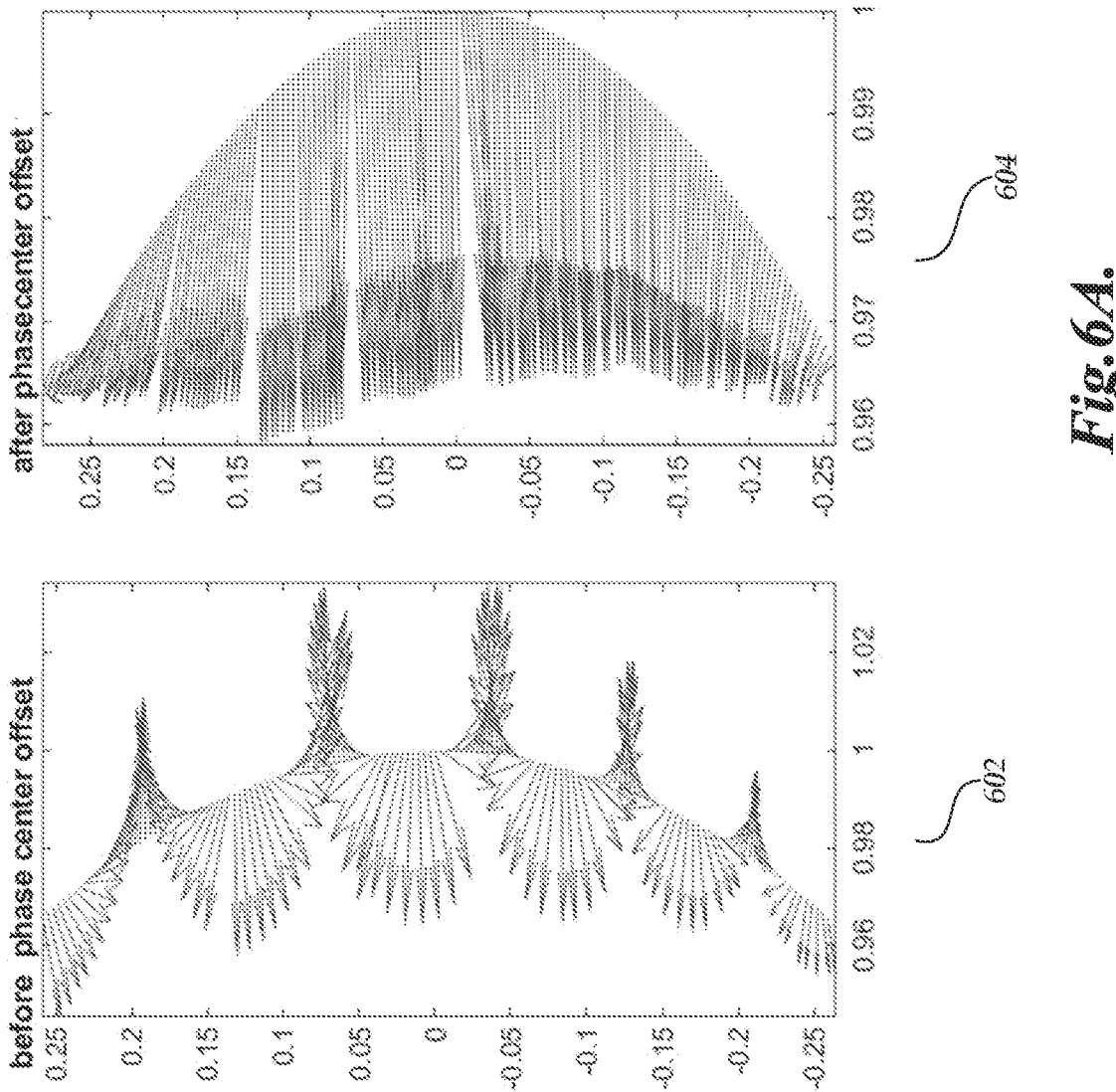
FIG. 6A shows an embodiment of a one dimensional angular measurement of antenna array response before and after a phase center offset.
Figure 6B:
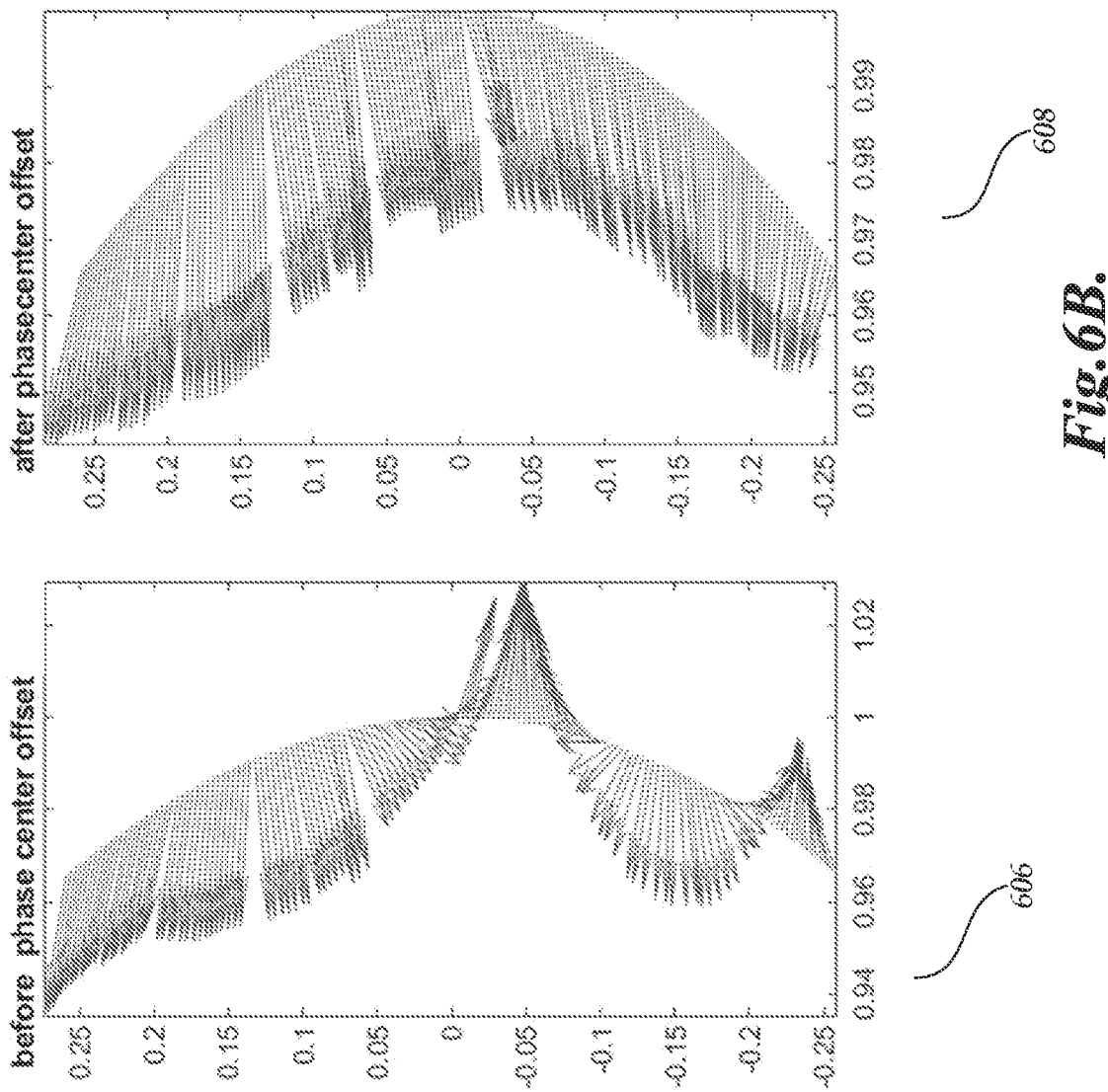
FIG. 6B shows an embodiment of a one dimensional angular measurement of antenna array response before and after a phase center offset.
Figure 6C:
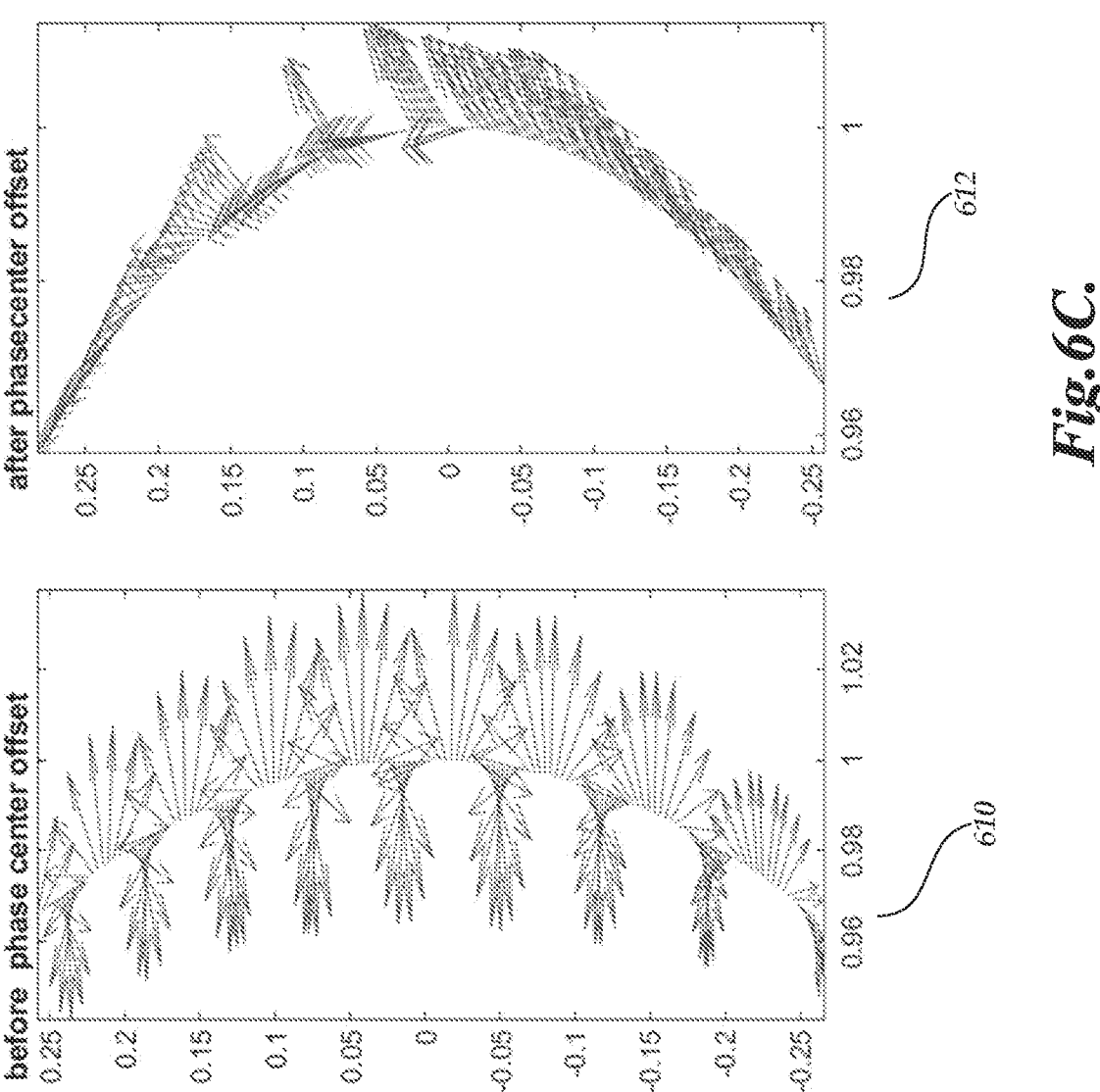
FIG. 6C shows an embodiment of a one dimensional angular measurement of antenna array response before and after a phase center offset.

At block 412, the processing component identifies the offset with the criteria above as a phase center of the antenna (offset from the physical center of rotation). FIGS. 6A-6C illustrate one dimensional angular measurement of antenna array response before phase center offset 602, 612, 622 and after the resulting phase center offset 604, 614, 624 for three illustrative ports of an antenna array. As illustrated in FIGS. 6A-6C, the offsetting the antenna location appropriately, causes a vector field response with many 'turns' (e.g., a high index number with respect to origin) to be reduced to one with 'mostly parallel' vector responses (i.e. zero index with respect to the new origin). According to block 412, the processing component identifies the new origin to be the phase center of this particular element (port) of the array.

Figure 7:
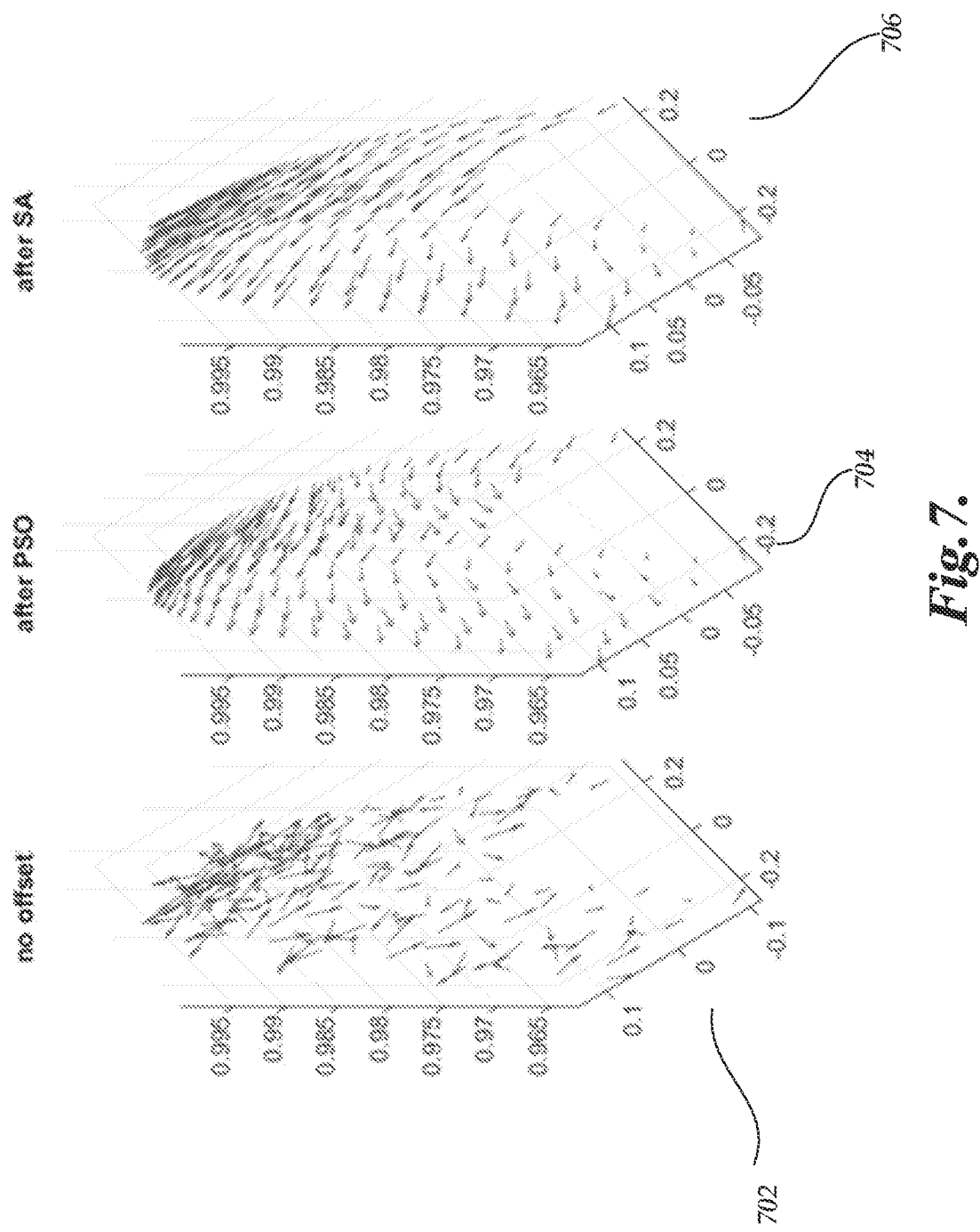
FIG. 7 shows a two dimensional antenna vector response and two optimization algorithms.

FIG. 7 illustrative an example of a two dimensional antenna vector response illustrating a uniform vector field 702 with minimized Laplacian when the offset transformation is applied to the vector field response of the antenna. Illustratively, in this example, the processing components utilizes two standard numerical optimization algorithms to search for the point that provides the lowest integral of the laplacian—Particle Swarm Optimization (PSO) 704 and Simulated Annealing (SA) 706. However, one skilled in the relevant art will appreciate that additional or alternative algorithms can be used, such as any standard numerical optimization algorithm can be used with suitable parameters.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other. Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

What is claimed:

1. A method of determining a phase center for a radar-sensor antenna comprising:
    obtaining at least one of a complex baseband response for a transceiver port combination;
    characterizing the at least one complex baseband response as a function of angle as a vector field;
    for a plurality of offsets, generating a set of angular momentum values based on a calculation of an integral of a Laplacian operation as a function of offset;
    determining the offset with a lowest integral of the Laplacian operator over an angular cut; and
    identifying the offset with the lowest integral as a phase center of an antenna;
    wherein the antenna is a multiple-input multiple-output array.

2. The method of determining a phase center for a radar-sensor antenna of claim 1, wherein the transceiver port combination comprises a transceiver Tx-Rx combination.

3. The method of determining a phase center for a radar-sensor antenna of claim 1, wherein the phase center of the antenna comprises a virtual phase center of the multiple-input multiple-output antenna.

4. The method of determining a phase center for a radar-sensor antenna of claim 1, wherein determining the offset with a lowest integral of the Laplacian operator over an angular cut comprises utilization of a particle swarm optimization.

5. A radar-sensor configuration processing system comprising:
    an antenna configured to receive a response; and
    a processor, wherein the processor is configured to;
        obtain at least one of a complex baseband response;
        characterize the at least one complex baseband response as a vector field;
        calculate an integral of a Laplacian operator as a function of an offset;
        determine the offset with a lowest integral of the Laplacian operator; and
        identify the offset with the lowest integral as a phase center of the antenna.

6. The radar-sensor configuration processing system of claim 5, wherein the offset corresponds to the offset between the phase center and a physical center.

7. The radar-sensor configuration processing system of claim 5, wherein the response is the complex baseband response.

8. The radar sensor configuration processing system of claim 5, wherein the processor is further configured to calculate an integral of the Laplacian operator as a function of the offset for a set of offsets.

9. The radar-sensor configuration processing system of claim 5, wherein determining an offset with a lowest integral of the Laplacian operator comprises utilization of a particle swarm optimization.

10. The radar-sensor configuration processing system of claim 5, wherein each of the at least one complex baseband response corresponds to a transceiver port Tx-Rx combination.

11. The radar-sensor configuration processing system of claim 10, wherein each of the at least one complex baseband response corresponds to the transceiver port Tx-Rx combination at each frequency and for an angular scan.

12. The radar-sensor configuration processing system of claim 5, wherein the antenna comprises a multiple-input multiple-output antenna.

13. The radar-sensor configuration processing system of claim 12, wherein the phase center of the antenna comprises the phase center of a virtual array of the multiple-input multiple-output antenna.

14. The radar-sensor configuration processing system of claim 5, wherein the characterization of the at least one complex baseband response as a vector field comprises a characterization of the at least one baseband response of an antenna array as a function of angle as the vector field.

15. A vehicle based radar configuration system comprising:
    a vehicle comprising multiple-input multiple-output antenna, wherein the multiple-input multiple-output antenna comprises at least one of an array of waveform generators and at least one of an array of digital receivers; and
    a control component comprising a processor, wherein the processor is configured to obtain at least one of a complex base band response and determine a phase center of the multiple-input multiple-output antenna based on a received complex baseband response.

16. The vehicle based radar configuration system of claim 15, wherein the phase center is determined as an offset from a physical center.

17. The vehicle based radar configuration system of claim 15, wherein the control component determines the phase center of the multiple-input multiple-output antenna based on the complex baseband response by:
    calculating an integral of a Laplacian operator as a function of a hypothetical offset;
    determining the hypothetical offset with a lowest integral of the Laplacian operator; and
    identifying the hypothetical offset with the lowest integral of the Laplacian operator as a phase center of the multiple-input multiple-output antenna.

18. The vehicle based radar configuration system of claim 17, wherein the determination of the phase center of the multiple-input multiple-output antenna based on the complex baseband response further comprises characterizing the at least one complex baseband response as a vector field prior to calculating an integral of a Laplacian operator as a function of a hypothetical offset.

19. The vehicle based radar configuration system of claim 15, wherein the phase center of the multiple-input multiple-output antenna comprises a virtual phase center of the multiple-input multiple-output antenna.

20. The vehicle based radar configuration system of claim 15, the determination of the phase center of the multiple-input multiple-output antenna is further based on a calculated angular momentum of a set of hypothetical offsets.

* * * * *